Aug. 18, 1936.                F. A. GAUGER                2,051,295
           AUTOMATIC VALVE AND SYSTEM OF CONTROL THEREFOR
                  Filed Dec. 26, 1934          2 Sheets-Sheet 1
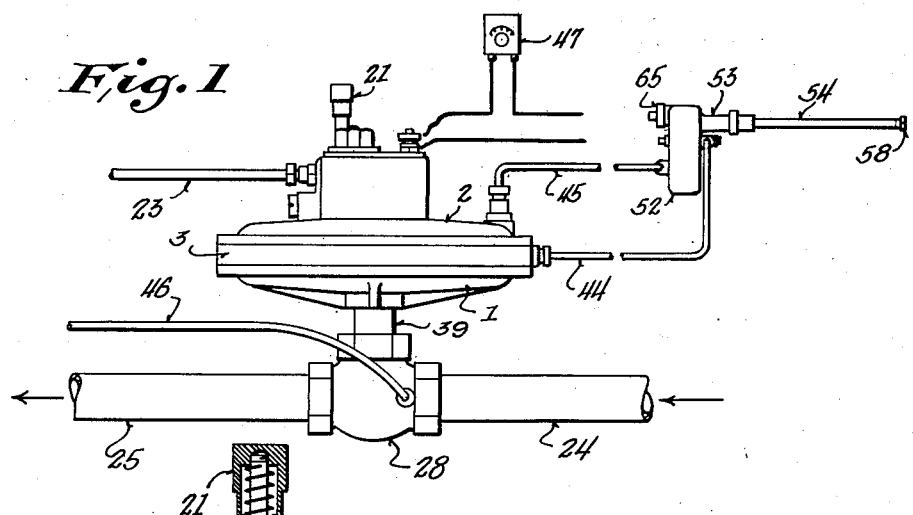
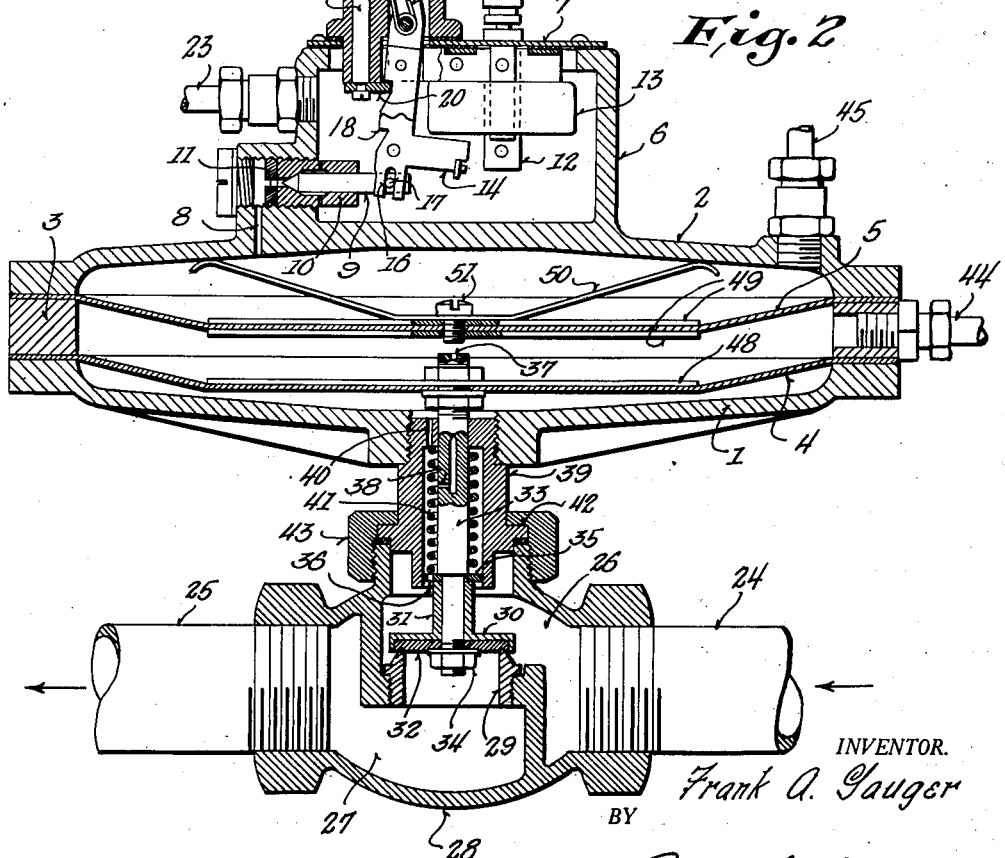
INVENTOR.
Frank A. Gauger
BY
Arthur R. Woofolk
ATTORNEY.

Aug. 18, 1936. F. A. GAUGER 2,051,295
AUTOMATIC VALVE AND SYSTEM OF CONTROL THEREFOR
Filed Dec. 26, 1934 2 Sheets-Sheet 2
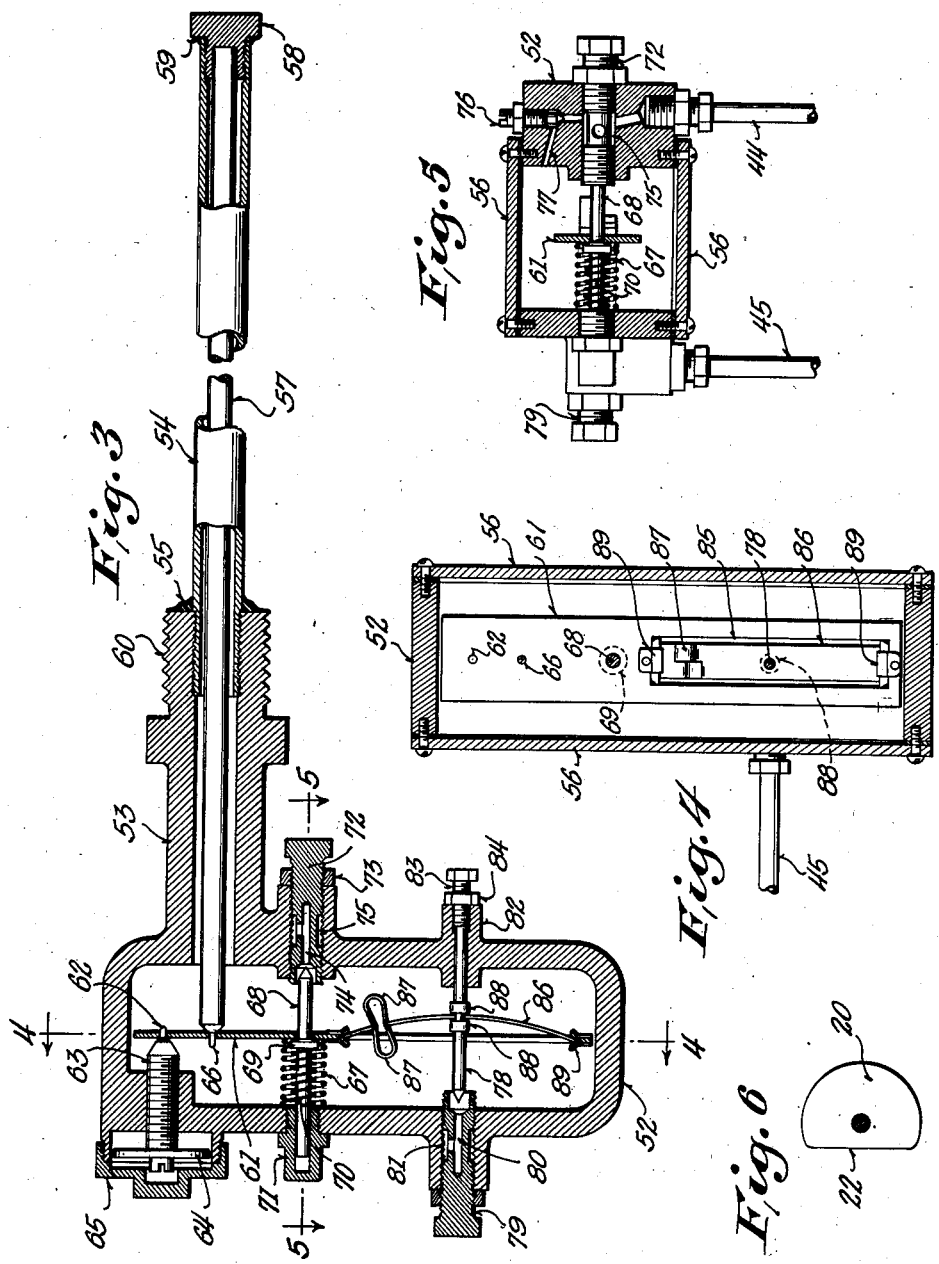
INVENTOR
Frank A. Gauger
BY
ATTORNEY.

Patented Aug. 18, 1936

2,051,295

UNITED STATES PATENT OFFICE 2,051,295

AUTOMATIC VALVE AND SYSTEM OF CONTROL THEREFOR

Frank A. Gauger, Milwaukee, Wis.

Application December 26, 1934, Serial No. 759,169

22 Claims. (Cl. 236—81)

This invention relates to an automatic valve and to a system of control therefor.

Objects of this invention are to provide a novel system of control for an automatic valve, such, for instance, as a gas valve, in which a main diaphragm operated gas valve is provided for controlling the flow of gas to a burner or other means, in which thermostatic means, pressure responsive means, means responsive to height of liquid, or other automatic regulator which adjusts itself in proportion to the temperature, pressure, or other conditions for which the automatic regulator is adapted, is provided for controlling the opening and closing of the valve, in which the regulator means has a snap action for quick opening and closing of the main valve and has means for throttling the main valve between the opening and closing of the snap action mechanism, so that the valve may float and adjust itself automatically to the desired condition through the throttling means and will thereafter be completely cut off by a snap action when the minimum flame exceeds the requirement of the burner, for instance.

Further objects are to provide a control system in which the thermostatic means cooperates in the system with the automatic valve and with the remote control means, such, for example, as a room thermostat, which may operate in the usual manner and may remotely control the main valve as, for example, through the intermediary of an electromagnetic relay, in which thermosatic means are provided for causing the valve to float between predetermined temperatures and automatically adjust itself in a gradual and uniform manner to varying requirements, in which the throttling of the main valve proceeds to the point of a minimum flame and thereafter the main valve is cut off by snap action means controlled by the thermosatic means, in which when the thermostatic means again causes the main valve to open, the main valve will open under the control of the snap action means with a quick and large opening movement to insure ignition of the burner, as, for instance, by means of a pilot burner, and will thereafter throttle the main burner down in a wholly automatic manner.

Further objects are to provide a thermostatic control for a main valve which is so made that a minimum flame adjustment is provided which may be set for one, two, three, or any number of burners, in which a throttling action takes place and causes the valve to float and accurately adjust itself to the temperature requirements, in which if the minimum flame adjustment is too great for the peculiar requirements of a particular system, the thermostatic means closes the main valve by a snap action, and in which after the main valve has been closed and the demand is for a further operation of the main burner, the main burner is turned on with a snap action so as to insure complete ignition thereof and thereafter is immediately throttled down to the exact requirements by the automatic thermostatic means.

Further objects are to provide a novel form of automatic valve which is so made that it has a diaphragm for operating the valve, the valve being biased towards closed position and being opened by means of gas pressure, automatic means being provided for varying the relative pressures above and below the diaphragm to cause the valve to float at any required point, depending on the temperature requirements, in which a second diaphragm is provided which also is controlled by pressure above and below the diaphragm, the second diaphragm completing the chamber above the first diaphragm and the motion of the second diaphragm being controlled by automatic means including an electromagnetic relay to permit quick upward motion of the second diaphragm, thereby allowing quick upward motion of the first diaphragm, which latter actuates the main valve, such construction also lending itself to automatic control of both diaphragms through thermostatic means so as to secure a floating action of the valve, as hereinabove set forth.

Further objects are to provide a double diaphragm automatic valve in which one diaphragm is operatively coupled to the main valve, such main valve being biased towards closed position, in which means are provided for supplying gas pressure beneath the first diaphragm, in which restricted bleed means is provided for furnishing gas pressure above the first diaphragm, the second diaphragm being free to float and preferably being slightly biased downwardly and constituting the upper chamber for the first diaphragm, an electromagnetic relay being provided which controls the discharge opening through the chamber above the upper diaphragm, such electromagnetic relay being so made that if the current would fail, it may be operated manually to open the discharge vent and thereafter when the current again comes on, the manual setting will be automatically released and the electromagnetic relay will again assume control.

In greater detail, objects of this invention are to provide a system in which an automatic diaphragm valve is provided which may be automatically either thermostatically or manually controlled by a small electric relay, and in addition in which an automatic regulator, for instance a thermostat, may be set for a given temperature and placed for example in the hood of a furnace, and to so relate the several elements of the apparatus that the automatic regulator will cause the valve to adjust itself and maintain a predetermined temperature, for instance, without requiring fluctuations above and below the temperature in normal operation but which when the minimum flame adjustment is above that required, a complete cut off by means of a snap action mechanism will be provided, and in which when the valve is re-lighted, the snap action mechanism provides for a quick wide opening of the valve to insure ignition at the burner, thereafter the automatic regulator again taking control and adjusting the flame in exact accord with the demands.

Further objects are to provide a construction of relay control diaphragm valve which is so made that the automatic regulator may be rendered inoperative if desired or may be completely removed without disturbing the relay control of the diaphragm valve.

Further objects are to provide an automatic regulator which may, for instance, be a thermostat or a device responsive to pressure, height of liquid, or other conditions, which is so made that it is adapted to control an automatic control valve for a main burner, in which the automatic regulator may be adjusted for a minimum flame, and which is also provided with throttling means to throttle the main valve and cause it to float and with snap action means to cause a complete cut-off for the main valve if the conditions require it, and which, on the other hand, is so made that the throttling means is wide open prior to the snap or quick opening of the snap action mechanism, the throttling means again assuming control of the valve after the valve is opened widely, thus insuring ignition at the main burner and thereafter causing the main valve to throttle down to the exact requirements.

Further objects are to provide an automatic valve and system therefor in which the parts are of simple construction, in which any adjustments required may be very readily made, and which is of a practical and serviceable nature and is reliable in operation, the construction lending itself readily to commercial manufacture.

Embodiments of the invention are shown in the accompanying drawings, in which:

Figure 1 is a side elevation showing the device and the associated parts of the system.

Figure 2 is an enlarged sectional view through the automatic valve.

Figure 3 is an enlarged sectional view through the automatic regulator.

Figure 4 is a sectional view on the line 4—4 of Figure 3.

Figure 5 is a sectional view on the line 5—5 of Figure 4.

Figure 6 is a view of the bottom portion of the manual control for the electromagnetic relay, partly in section.

Referring to the drawings, it will be seen that the device comprises a casing having a lower portion 1 and an upper portion 2 and a spacing ring 3 between such casings. These three parts form the diaphragm casing and house the lower or main diaphragm 4 and the upper or auxiliary diaphragm 5. The upper casing 2 continues upwardly to form a housing 6 provided with a cover 7 secured thereto in any suitable manner and preferably provided with a gasket as shown. The casing 6 is hollow and is provided with a bleed 8 leading to the upper portion of the casing 2. The communication of the bleed or passageway 8 with the interior of the casing 6 is controlled by means of a plunger needle valve 9 whose valve seat 10 is screwed into a threaded boss in the casing 6 and locked by means of the lock nut 11.

The reciprocation of the valve 10 is controlled by means of an electromagnetic relay whose yoke portion is indicated at 12, the energizing coil at 13, and the armature at 14. This armature tends to swing away or drop away from the core under the influence of gravity, and this action is further assisted by means of the relatively light spring 15. It is provided with a shading coil and in accordance with the usual practice both the armature and the core or yoke portion are formed of laminated material.

The armature is approximately L-shape and is provided with a slotted part 16 which receives the pin 17 carried by the plunger 9, and thus serves to reciprocate the plunger, opening the valve when the electromagnetic relay is energized and closing the valve when the electromagnetic relay is deenergized.

The outer portion of the armature 14 is provided with a notch or shouldered portion 18 and an upwardly urged manually depressible plunger 19 is provided and may be depressed manually to open the valve 9. This plunger is provided with a disk 20 which when the plunger 19 is depressed, engages beneath the shoulder 18 of the armature and thus holds the valve 9 open. However, when the electromagnetic relay is again energized, the manual control is released and snaps upwardly into the position shown in Figure 1 so that the electromagnetic relay again assumes control. The manual control is provided in the event either that it is desired to dispense wholly with the effect of the electromagnetic relay or in the event that it is desired to open the valve 9 when there is no current for the electromagnetic relay.

It is to be noted that the plunger 19, see Figure 2, is provided with an external manipulating member 21 so as to allow the plunger to be either depressed or rotated. From Figure 6, which shows an enlarged view of the disk 20, it will be seen that the disk is provided with a cut away portion or flat face 22 so that the manually manipulable member 21 may be rotated to present the flat face towards the armature and thereby clear the disk of the notch or shoulder 18 and allow the manual member to rise to its initial position, also allowing the valve 9 to close.

It is to be noted from Figures 1 and 2 that the casing 6 is provided with a discharge pipe 23 which may lead to any suitable point, for instance adjacent the main burner if the device is applied to the control of a gas burner.

The main valve controls the flow of fluid, such as gas, for instance, from the inlet portion 24 to the outlet portion 25 through the inlet duct 26 to the outlet duct 27 of the body portion 28 of the valve. A valve seat 29 may be provided and screwed into the body portion, as shown in Figure 2, and the movable member or valve proper 30 may consist of a shouldered disk provided with an upwardly extending sleeve 31 and may carry a gasket or washer 32.

A shouldered valve stem 33 has a reduced portion passing through the sleeve 31 and has a threaded lower end which receives a washer and a nut 34, thus clamping the valve stem to the valve and holding the gasket 32 in place. It is preferable to provide a small disk 35 between the shouldered portion of the valve stem 33 and the sleeve 31 so that this disk is clamped in place when the nut 34 is tightened.

The disk is apertured as indicated at 36 and the valve stem is provided with an axial hole 37 leading through its upper end and communicating with a radially extending hole 38.

A bored out fitting 39 is screwed into the lower casing 1 and is provided with a transverse upper portion having a small bleed opening 40 leading to the bottom portion of the casing 1 below the main diaphragm 4. A spring 41 is positioned loosely around the valve stem 33 within the fitting 39 and bears against the disk 35, thus urging the main valve 30 towards closed position.

The fitting 39 is provided with a flange 42 which forms with the ring nut 43 a coupling or union so that the fitting 39 may be clamped to the body portion 28 of the valve, a suitable gasket being interposed between such portions, as shown in Figure 2.

From Figures 1 and 2, it will be seen that a pipe 44 leads from the space between the main diaphragm 4 and the auxiliary diaphragm 5 and a pipe 45 leads from the space above the auxiliary diaphragm 5. From Figure 1 it will be seen that a by-pass pipe 46 leads from the body portion of the main valve 28, for example to a pilot light not shown, the main discharge pipe 25 leading to the main burner not shown. The electromagnetic relay is controlled by any suitable means, for instance the room thermostat as indicated at 47 in Figure 1.

The main diaphragm 4 is provided with a plate 48 on its upper side and is clamped to the valve stem 33. The bleed port 37, however, formed in the valve stem 33, opens above the diaphragm 4 between the main and auxiliary diaphragms. The upper diaphragm 5 is provided with a pair of plates 49 on its upper and lower sides and is preferably provided with a relatively light leaf spring 50, all of the parts being held together in any suitable manner, as by means of the screw or bolt 51. The ends of the spring 50 bear against the under side of the upper casing 2, as shown in Figure 2.

The automatic regulator chosen for illustration is of the thermostatic type. It comprises a casing 52 having an elongated neck portion 53, see Figure 3, in which the copper or other tube 54 is threaded and to which it is secured by means of solder, brazing, or other means as indicated at 55. The casing 52 is open at opposite ends and is closed by end plates 56, as shown in Figures 4 and 5, these end plates being provided with suitable gaskets, as indicated, to make a gastight fit.

The thermostatic element or unit includes the tube 54 and the rod 57, the rear end of the rod being secured within the end cap or plug 58. The plug 58 is threaded into the tube 54 and may be soldered, brazed, or otherwise secured thereto, as indicated at 59, after the final adjustment has been made. This entire unit is adapted to be screwed into the furnace bonnet, boiler, or other device, in the usual manner and is provided with a threaded portion 60, see Figure 3, for such purpose.

The thermostatic member operates a lever 61 located within the casing 52 and carried at its upper fulcrum point upon a pin 62 formed on the adjusting screw 63. This adjusting screw is preferably provided with a graduated dial 64 on the outside of the casing 52 to facilitate adjustment and the entire device is closed off by means of a cap 65 screwed onto a threaded boss formed on the casing 52. The end of the rod 57 is also provided with a projecting pin 66 which fits into a corresponding hole formed in the lever 61. The lever 61 is urged so that it tends to rock in a counterclockwise direction, as viewed in Figure 3, by means of the outer helical spring 67. It is apertured adjacent this point and a throttle valve member 68 projects therefrom. This member is provided with an enlarged or shouldered portion 69 located on the left hand side of the lever 61, as viewed in Figure 3. An inner and smaller helical spring 70 bears against this shoulder 69 and urges the throttle valve 68 towards seated or closed position.

One end of the throttle valve rod is carried in a cup-shaped guide member 71 screwed into the casing 52. The other end of the throttle valve is formed conical to provide a needle valve. It has a seat portion formed in the valve seat plug 72, as clearly shown in Figure 3. This seat portion is adjustable to provide the exact point for correct cooperation with the throttle valve and this adjustment is secured by screwing the seat portion 72 in or out with reference to the casing 52, thereafter locking it by means of the lock nut 73. This seat portion is provided with a central passageway 74 and with an annular recess or turned down portion 75 communicating therewith.

This annular recessed portion provides with the adjacent part of the casing 52 an annular passageway, as most clearly shown in Figure 5, so that the pipe 44 places this annular passageway 75 in communication with the space between the main diaphragm 4 and the auxiliary or upper diaphragm 5, see Figures 1, 2 and 5. A minimum flame adjustment is provided by means of the set screw 76, see Figure 5, which controls a by-pass duct 77 communicating with the annular passageway 75. This set screw is adjusted for one, two, three, or any number of burners for the minimum flame desired.

A snap action cut-off valve 78, see Figure 3, is also provided and has an adjustable valve seat portion 79 similar to the portion 72 previously described. This seat is similarly provided with its central opening 80 which communicates with an annular passageway 81 formed by turning down a portion of the valve seat 79 exactly similar to that previously described. This annular portion 81 communicates with the pipe 45, see Figure 5, and the snap valve 78, therefore, controls the flow of gas through the pipe 45. The other end of the valve 78 is guided in a boss 82 formed integrally with the casing 52, for instance, and the opening therethrough is closed by means of the adjustable stop screw 83 which is locked in place by means of the lock nut 84.

The lever 61, see Figures 3 and 4, is provided with a rectangular cut out portion 85 within which a bowed spring strip 86 is positioned. This spring strip is provided with a slitted portion whose two parts are oppositely bowed, as indicated at 87. This construction may follow that disclosed in my Patent No. 1,954,446 of April 10, 1934, for Thermostat.

The bowed spring 86 has an aperture through which the valve stem 78 passes and shoulders are provided as indicated at 88 on opposite sides of the spring 86. The ends of this bowed leaf spring are carried within V-shaped socket members 89 rigidly carried by the lever 61.

The operation of the apparatus will be understood better, it is believed, by describing first the action of the parts separately, it being understood that the automatic regulator, whether of a thermostatic type, pressure responsive type, or other type, controls the flow of gas from the pipe 44 to the pipe 45 and either permits a free flow or restricted flow or cuts off the flow entirely, depending upon the condition of the automatic regulator. With this in mind it is believed that a description of the automatic valve, as shown in detail in Figure 2 and in the general system in Figure 1, will be clearly understood.

Assuming that the device is connected to a main burner, it is clear that the incoming gas passes from the pipe 24 to the pipe 25, see Figure 2, when the main valve is open. The opening of the main valve will be accomplished if the electromagnetic relay is energized as the needle valve 9 will be opened and will connect the upper chamber above the auxiliary diaphragm 5 with the air. Consequently pressure is reduced in this upper chamber and both diaphragms rise as gas pressure is supplied beneath the main diaphragm 4 through the bleed passage 37 formed in the main valve stem 33, as previously described.

The upper diaphragm 5 will rise to its upper limit and will there stop. The position of the lower diaphragm and consequently of the main valve will be controlled by the amount of gas passing from the pipe 44 to the pipe 45, that is to say, will be now directly under the control of the automatic regulator, such as the thermostatic device shown in Figure 3. Assuming that this automatic regulator allows gas to pass from the pipe 44 to the pipe 45, pressure will not build up above the upper diaphragm 5 nor will it build up above the upper diaphragm 4 as these spaces are vented through the passageway 8 and the pipe 23, see Figure 2, controlled by the electromagnetically operated valve 9.

On the other hand, if the valve 9 closes, that is to say, if the electromagnetic relay is deenergized, as, for instance, would be caused by the opening of the room thermostat 47, see Figure 1, it is apparent that the valve 9 closes and pressure builds up both above and below the auxiliary diaphragm 5 and above the main diaphragm 4 to an extent equal to that below the main diaphragm 4 so that the spring 41 biasing the main valve towards closed position will cause the main valve to close.

Additionally, the auxiliary diaphragm 5 will descend as it is biased towards its downward position by means of the weight of the plates 49 and also by means of the spring 50. Either or both of these expedients can be used. Obviously it is apparent that either a spring or a weight can be used also for biasing the main diaphragm and consequently the main valve towards closed position.

Assuming that the electromagnetically controlled vent or discharge valve were opened, the action of the automatic regulator will best be understood. This automatic regulator allows gas to pass from between the diaphragms 4 and 5 to the outside air by way of the electromagnetically controlled valve 9, see Figures 1 and 2. The regulator has the throttling valve 68 so that when the temperature increases and the lever 61 moves in a counterclockwise direction under the influence of the spring 67 following the retraction of the rod 57, it is apparent that the throttling valve 68 will throttle more and more and thus allow less and less gas to escape from above the main diaphragm 4, thereby causing the main valve to float and accurately adjust itself to the demands of the thermostatic regulator.

Assume that there is very little load on the furnace and that the bonnet temperature or boiler temperature continues to increase, it is apparent that the throttling valve will finally cut off completely. However, the minimum flame adjustment permits gas to escape through the passageway 77, see Figure 5. This will maintain a minimum flame. The minimum flame adjustment, as previously described, will be set in accordance with the number of burners employed in the furnace.

However, assume that the minimum flame is more than is required. It is apparent that upon further increase in temperature, the lever 61 will continue to rock in a counterclockwise direction, as viewed in Figure 3, and will move away from the shouldered portion 69 of the throttling valve which is now completely closed.

The snap action mechanism will now operate as the bowed spring 86 will then have been carried past dead center due to the valve 78 having hit its stop point and the valve 78 will, therefore, snap closed and cut off all passage of gas through the automatic regulator and consequently all passage of gas from the space above the main diaphragm 4. Consequently the main valve will seat and completely cut off even the minimum flame supply to the main burner, so that no damage whatsoever can result even under the most unusual conditions.

It is immaterial now whether the electromagnetic relay valve opens or closes as it will have no effect upon the main diaphragm 4 as there is now no escape for gas from above the main diaphragm 4.

On the other hand, assume that the electromagnetic relay is still open and that the temperature within the furnace drops to a sufficient point so that a small flame is desired. Obviously it would be difficult to insure ignition under these conditions if only the small flame supply were first turned on. This invention, however, provides, through the medium of the snap action mechanism and the automatic regulator, means for suddenly widely opening the main valve so that ignition of the burners may be insured and thereafter immediately throttling the main valve down to the exact requirements, even to that of the minimum flame adjustment if it is so required.

This is accomplished through the medium of the automatic regulator as used in the system described. For example, if the temperature decreases after the snap action cut-off valve 78, see Figure 3, is closed, it will be seen that the throttle valve first opens but that no gas passes through the regulator as the cut-off snap action valve 78 is still closed. However, as the temperature continues to decrease, the lever 61 continues to rock in a clockwise direction and the bowed spring 87 is carried over center, snapping the snap action valve 78 to fully open position and allowing the main valve to open widely, thus insuring perfect ignition at the main burner.

However, assume that the demand is very low. The flame is immediately throttled down as the lever 61 now starts moving in a counterclockwise direction and the flame is immediately throttled down due to the throttling action of the throttle valve 68 which controls the main valve in a manner hereinbefore described.

Assume another condition, namely, that a very small flame or in fact the minimum flame may be the requirement due to the particular temperature at which the furnace or boiler is now operating and that the electromagnetic valve is closed. It is apparent that under these conditions the upper diaphragm will be in its lowest position and that the bottom diaphragm will also be in its bottom position. Suppose now that the room thermostat is either moved up suddenly or else automatically allows energization of the electromagnetic relay and thus opens the electromagnetically controlled valve 9. Under these conditions the upper diaphragm will suddenly move upwardly as the pressure above such diaphragm is relieved.

As this diaphragm moves upwardly, it is apparent that the pressure above the lower diaphragm 4 or main diaphragm is also suddenly relieved. This diaphragm will, therefore, move upwardly and widely open the main valve, thus insuring perfect ignition at the burner. However, if a very small flame adjustment is required, it is apparent that the automatic regulator throttles down on the escape of gas from between the diaphragms and consequently although the upper diaphragm or auxiliary diaphragm is in its uppermost position, nevertheless pressure will build up between the diaphragms and cause the lower diaphragm to descend, thus throttling the main valve and adjusting the burner flame to the exact requirements.

It will be seen that a system of control and automatic regulator and an automatic valve have been provided by this invention which are so made that quick opening and closing of the main valve as well as throttling for the main valve between the opening and closing of the snap action means is secured.

It will be seen further that wide opening of the main valve is obtained whenever the main burner is to be lighted, irrespective of the setting of the regulator so as to thereby insure complete ignition under all conditions, subsequent throttling of the main burner taking place.

It will be seen further that remote control means are also provided which so cooperate with the remaining parts of the system as to secure quick opening and closing of the main valve, such means operating independently of the thermostatic regulator.

It will also be seen that snap action cut-off means is provided for cutting off even the minimum flame under unusual conditions and in an automatic manner should this be required.

It will be seen further that although the system and the several automatic devices therein provide the above described elaborate control of the burner, that nevertheless the devices employed are relatively simple and are substantially foolproof in their operation.

Although this invention has been described in considerable detail, it is to be understood that such description is intended as illustrative rather than limiting, as the invention may be variously embodied and is to be interpreted as claimed.

I claim:

1. In a control device, a main valve, diaphragm means for opening and closing said valve, automatic regulator means controlling the opening and closing of said valve, said regulator means having snap action mechanism for effecting quick opening and closing of said valve, and means for throttling said valve between the quick opening and closing motion of said valve.

2. In a control device, a main valve, diaphragm means for opening and closing said valve, automatic regulator means controlling the opening and closing of said valve, said regulator means having snap action mechanism for effecting quick opening and closing of said valve, and means controlled from said regulator for throttling said valve between the quick opening and closing motion of said valve.

3. In a control device, a main valve, diaphragm means for opening and closing said valve, thermostatic means controlling the opening and closing of said valve, said thermostatic means having snap action mechanism for effecting quick opening and closing of said valve at predetermined temperature limits, and means for throttling said valve between the quick opening and closing motion of said valve.

4. In a control device, a main valve, diaphragm means for opening and closing said valve, thermostatic means controlling the opening and closing of said valve, said thermostatic means having snap action mechanism for effecting quick opening and closing of said valve at predetermined temperature limits, and means controlled from temperature variation for throttling said valve between the quick opening and closing motion of said valve.

5. In a control device, a main valve, diaphragm means for opening and closing said valve, thermostatic means controlling the opening and closing of said valve, said thermostatic means having snap action mechanism for effecting quick opening and closing of said valve at predetermined temperature limits, and means controlled from said thermostatic means for throttling said valve between the quick opening and closing motion of said valve.

6. In a control device, a main valve, diaphragm means for opening and closing said valve, automatic regulator means controlling the opening and closing of said valve, said regulator means having snap action mechanism for effecting quick opening and closing of said valve, means for throttling said valve between the quick opening and closing of said valve, said last mentioned means being controlled from said automatic regulator, and remote control means for effecting quick opening and closing of said valve.

7. In a control device, a main valve, diaphragm means for opening and closing said valve, automatic regulator means controlling the opening and closing of said valve, said regulator means having snap action mechanism for effecting quick opening and closing of said valve, means for throttling said valve between the quick opening and closing of said valve, said last mentioned means being controlled from said automatic regulator, and remote control means for effecting quick opening and closing of said valve, said remote control means operating independently of said regulator means.

8. In a control device for a burner, a main valve, diaphragm means for opening and closing said valve, automatic regulator means controlling the opening and closing of said valve, said regulator means having snap action mechanism for effecting quick opening and closing of said valve, means for throttling said valve between the quick opening and closing of said valve, said regulator means having a minimum flame adjustment, and said snap action mechanism when in one position causing said main valve to completely close and cut off the minimum flame supply to the burner.

9. In a control device for a burner, a main valve, diaphragm means for opening and closing said valve, automatic regulator means controlling the opening and closing of said valve, said regulator means having snap action mechanism for effecting quick opening and closing of said valve, means for throttling said valve between the quick opening and closing of said valve, said regulator means having a minimum flame adjustment, and said snap action mechanism when in one position causing said main valve to completely close and cut off the minimum flame supply to the burner, and remote control means for effecting quick opening and closing of said main valve.

10. In a control system for a burner, a main valve, diaphragm means for opening and closing said valve, thermostatic means controlling the opening and closing of said valve, said thermostatic means having a minimum flame adjustment and having snap action mechanism for effecting complete opening and closing of said main valve, and means for throttling said main valve between the opening and closing of said main valve and having a complete cut off beyond said minimum flame.

11. In a control system for a burner, a main valve, diaphragm means for opening and closing said valve, thermostatic means controlling the opening and closing of said valve, said thermostatic means having a minimum flame adjustment and having snap action mechanism for effecting complete opening and closing of said main valve, and means for throttling said main valve between the opening and closing of said main valve and having a complete cut off beyond said minimum flame, said thermostatic means having a full snap opening for causing a wide opening of said main valve when said thermostatic means has cooled beyond a predetermined point.

12. An automatic regulator comprising a fluid condition responsive member, main movable means operated therefrom, a throttling valve operated from said main movable means, and a snap action cut-off valve operated from said main movable means and controlling the flow of fluid from said throttling valve, said throttling valve having its throttling action between the quick opening and closing motion of said snap action cut-off valve.

13. An automatic regulator comprising a fluid condition responsive member, main movable means operated therefrom, a throttling valve operated from said main movable means, minimum by-pass means by-passing said throttling valve, and a snap action cut-off valve operated from said main movable means and controlling the flow of fluid from said throttling valve and from said by-pass means, said throttling valve having its throttling action between the quick opening and closing motion of said snap action cut-off valve, said snap action valve cutting off all flow of fluid from said throttling valve and from said by-pass means when in closed position.

14. An automatic regulator comprising a fluid condition responsive member, main movable means operated therefrom, a throttling valve operated from said main movable means, and a snap action cut-off valve operated from said main movable means and controlling the flow of fluid from said throttling valve, said throttling valve having its throttling action between the quick opening and closing motion of said snap action cut-off valve, said throttling valve being full open prior to the quick opening of said snap action valve.

15. An automatic regulator comprising a thermostatic unit, a lever moved by said thermostatic unit, a throttling valve operated from said lever, snap action mechanism operated by said lever, and a cut-off valve operated from said snap action mechanism and controlling the flow of fluid from said throttling valve.

16. An automatic regulator comprising a thermostatic unit, a lever moved by said thermostatic unit, a throttling valve operated from said lever, snap action mechanism operated by said lever, a cut-off valve operated from said snap action mechanism and controlling the flow of fluid from said throttling valve, and minimum by-pass means by-passing said throttling valve, said cut-off valve completely cutting off flow of fluid from both said throttling valve and from said minimum by-pass means when said cut-off valve is in closed position.

17. A diaphragm valve comprising a main valve biased towards closed position, a main diaphragm operatively connected to said valve, a diaphragm casing enclosing said main diaphragm, an auxiliary diaphragm carried within said casing above said main diaphragm and biased towards said main diaphragm, and means for establishing communication between the space above said auxiliary diaphragm and between said diaphragms.

18. A diaphragm valve comprising a main valve biased towards closed position, a main diaphragm operatively connected to said valve, a diaphragm casing enclosing said main diaphragm, an auxiliary diaphragm carried within said casing above said main diaphragm and biased towards said main diaphragm, means for establishing communication between the space above said auxiliary diaphragm and between said diaphragms, and remote control means for controlling venting of the space above said auxiliary diaphragm.

19. In a control system for a burner, a main valve, diaphragm means for opening and closing said valve, automatic regulator means controlling the opening and closing of said valve, said automatic regulator means having a minimum flame adjustment and having snap action mechanism for effecting complete opening and closing of said main valve, and means for throttling said main valve between the opening and closing of said main valve and having a complete cut off beyond said minimum flame, said automatic regulator means having a full snap opening for causing a wide opening of said main valve when said automatic regulator means has moved beyond a predetermined point.

20. An automatic regulator for a burner comprising a fluid condition responsive member, a main movable means operated therefrom, a throttling valve operated from said main movable means, and a snap action cut-off valve operated from said main movable means and controlling the flow of fuel from said throttling valve, said throttling valve having its throttling action between the quick opening and closing motion of said snap action cut-off valve, said automatic regulator having a minimum flame adjustment and said snap action cut-off valve completely cutting off flow of fuel from said throttling valve and from said minimum flame adjustment when in closed position and having a complete opening when in open position, said throttling valve opening prior to the opening of said snap action cut-off valve.

21. An automatic regulator comprising a thermostatic unit, means moved by said thermostatic unit, a throttling valve operated from said means, snap action mechanism operated by said means, and a cut-off valve operated from said snap action mechanism and controlling the flow of fluid from said throttling valve.

22. An automatic regulator comprising a thermostatic unit, means moved by said thermostatic unit, a throttling valve operated from said means, snap action mechanism operated by said means, a cut-off valve operated from said snap action mechanism and controlling the flow of fluid from said throttling valve, and minimum by-pass means by-passing said throttling valve, said cut-off valve completely cutting off flow of fluid from both said throttling valve and from said minimum by-pass means when said cut-off valve is in closed position.

FRANK A. GAUGER.